United States Patent

Berman et al.

[11] Patent Number: 5,195,631
[45] Date of Patent: Mar. 23, 1993

[54] OPTIMUM SCREW

[75] Inventors: George K. Berman, Moscow, U.S.S.R.; Vladimir N. Kestelman, Pennsauken, N.J.; George S. Khait, Alameda, Calif.

[73] Assignee: Development Products, Inc., Pennsauken, N.J.

[21] Appl. No.: 771,455

[22] Filed: Oct. 1, 1991

[51] Int. Cl.[5] ............................................. B65G 33/26
[52] U.S. Cl. .................................................. 198/676
[58] Field of Search ........................................ 198/676

[56] References Cited

U.S. PATENT DOCUMENTS

| 1,670,165 | 5/1928 | Popper | 198/676 X |
| 2,896,253 | 7/1959 | Mol | 198/676 X |
| 3,155,288 | 11/1964 | Landgraf | 198/676 X |

FOREIGN PATENT DOCUMENTS

| 2737448 | 3/1979 | Fed. Rep. of Germany | 198/676 |
| 1222856 | 2/1971 | United Kingdom | 198/676 |

Primary Examiner—D. Glenn Dayoan
Attorney, Agent, or Firm—Simpson & Simpson

[57] ABSTRACT

A screw pump is disclosed in which a screw portion of the pump is constructed having an eccentric portion e, wherein the pitch S of the screw is equal to 4e. The screw channel depth h, is equal to 2e (twice the eccentricity). The resulting screw has an optimum geometric shape allowing maximum pumping capability to be achieved.

1 Claim, 2 Drawing Sheets

OPTIMUM SCREW

BACKGROUND OF THE INVENTION

1. Field of the Invention

The present invention relates to devices for pumping materials and, more particularly, to pumps containing a double-threaded stator accommodating a single-threaded screw-rotor. The device of the present invention can be used for pumping various materials in different branches of industry, including petroleum products, oils, latexes, alkalies, clay solutions and various liquid food products.

2. Description of the Related Art

Known in the art are pumps constructed in accordance with USSR Inv. Cert. No. 1,079,894, 1984, MK F 04 c 5/00, in which an outer threaded surface of a screw-rotor and an internal surface of a stator (conveying tube) are conically shaped. For the purpose of increasing the stability of the pump in the course of operation, the diameter of the threaded surface varies inversely with variations of the external surface diameter.

A disadvantage of this construction is that the coupling of the conical screw-rotor with the stator does not result in maximum specific volume (and, consequently, the capacity) of the area between the rotor threads and the stator.

Also known in the art is a pump constructed in accordance with U.S. Pat. No. 4,406,602, having a parabolic screw. However, a disadvantage of this construction is that the parabolic curve results in a screw geometry that does not maximize the capacity of the pump.

Another known pump is the single-threaded rotary pump II8-OHA manufactured in the USSR. The vertical longitudinal profile of the screw of the II8-OHA represents the reiterative concave and convex catenary lines of arbitrary curvature. When the screw rotates, the material in the closed spaces between the internal and external surfaces of the screw and stator is conveyed by pressure from one closed space to the next over the entire pump length until it reaches the outlet pipe. The screw pump capacity depends on the size of the closed space between the screw and stator surfaces, and the maximum size of the closed space depends on the area defined by the cross-sectional vertical longitudinal profile of the screw.

A disadvantage of a pump constructed in this manner is that, for the given geometry of the screw, the capacity is not maximized since its vertical profile is formed by a catenary line, i.e., by a curve which fails to maximize the use of the area in the screw cross-section.

SUMMARY OF THE INVENTION

The object of the present invention is to provide a screw that obtains the maximum pump capacity while retaining the same general geometric parameters of existing screws.

According to the present invention, the screw portion of the pump is constructed having an eccentric portion e, wherein the pitch S of the screw is equal to 4e. The screw channel depth h, is equal to 2e (twice the eccentricity).

DESCRIPTION OF THE PREFERRED EMBODIMENT

Figure 2:
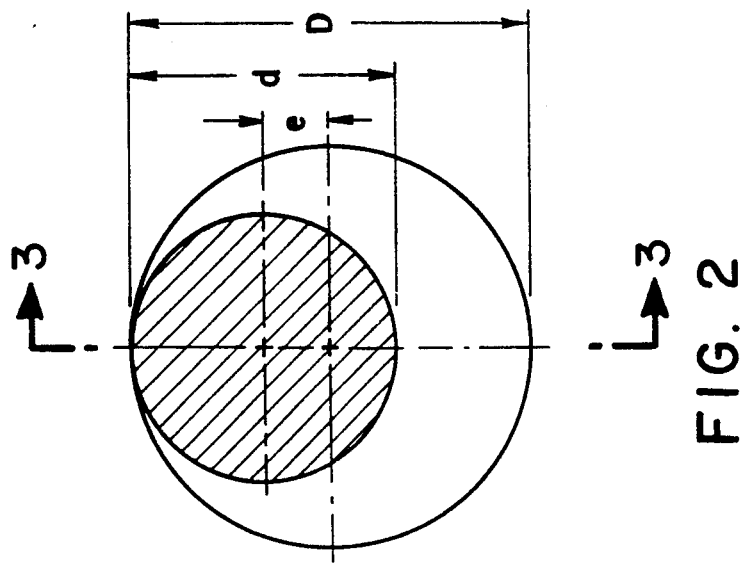
FIG. 2 is a vertical cross-sectional view taken along line A—A of FIG. 1.
Figure 1:
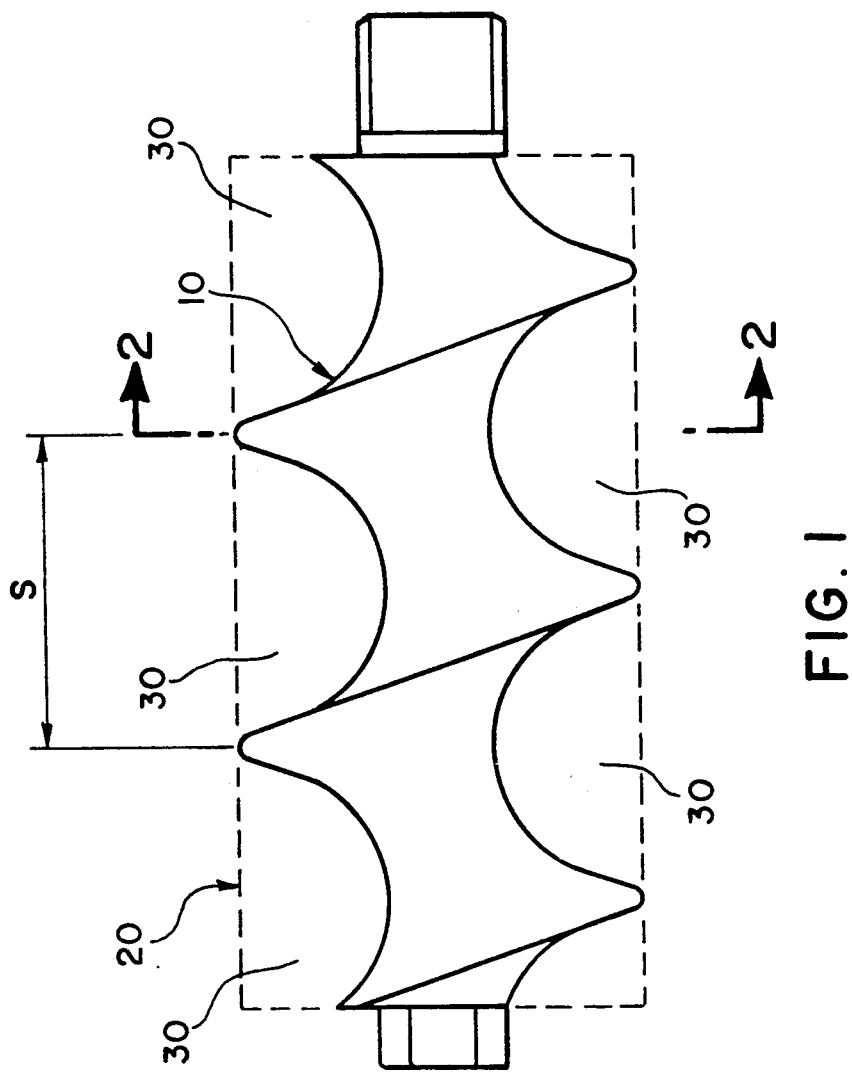
FIG. 1 is a perspective view of a screw according to the present invention.

The present invention is described below with reference to FIGS. 1–3. A helical screw rotor 10 is situatable in a conveying tube 20. Conveying tube 20 is a cylinder in which the screw rotor 10 will snugly fit, but be able to rotate about its longitudinal axis. The basic parameters for manufacturing the screw are the outer diameter D, defined as the diameter of a circle described by the cross section of a cylinder into which the helical screw rotor will snugly fit (essentially, this is the diameter of the vertical cross section of conveying tube 20); the cross-section diameter (d), selected based on the strength of the material used; the eccentricity (e), defined as the distance between the center of the circles defined by outer diameter D and cross-section diameter d; the channel depth h, defined as the distance between the mid-point of a line tangent to the outermost points of two successive spiral convolutions of the screw and the point at which a line perpendicularly bisecting said tangent line at said midpoint intersects with said screw; and the pitch S of the screw, defined as the distance between the outmost points of two successive spiral convolutions of the screw.

The optimum geometry for this screw having the above parameters can be achieved by satisfying the following equations:

$$\text{Channel depth } h = \text{outer diameter } D - \text{cross-section diameter } d; \quad (1)$$

$$\text{Pitch } S = 2h; \text{ and} \quad (2)$$

$$\text{Eccentricity } e = \tfrac{1}{2}D - \tfrac{1}{2}d. \quad (3)$$

It can be derived from the above equations that the channel depth h can be determined by the equation h=2e, and the outer diameter D of the screw is determined by the equation D=d+2e.

Such construction forms a conveying cavity 30 between the screw rotor 10 and the wall of the conveying tube 20. The shape of the cross-section of the conveying cavity is semicircular, thereby maximizing the conveying capacity of the screw. The semicircle is described by the radius R extending from a center C lying on a line tangent to the outermost points 40 and 45 of two successive spiral convolutions of the screw. The radius R is equal to twice the length of the eccentric portion e of the screw and is therefore also equal to the screw channel depth h.

By constructing the screw in the above-described manner, the geometric shape of the screw, which is the main working element of the pump, is optimized. This results in the maximum pump capacity while retaining the general geometric parameters of existing screws.

To construct the optimum screw shape, the cross-section of a single turn over the length of one pitch S was considered.

Figure 3:
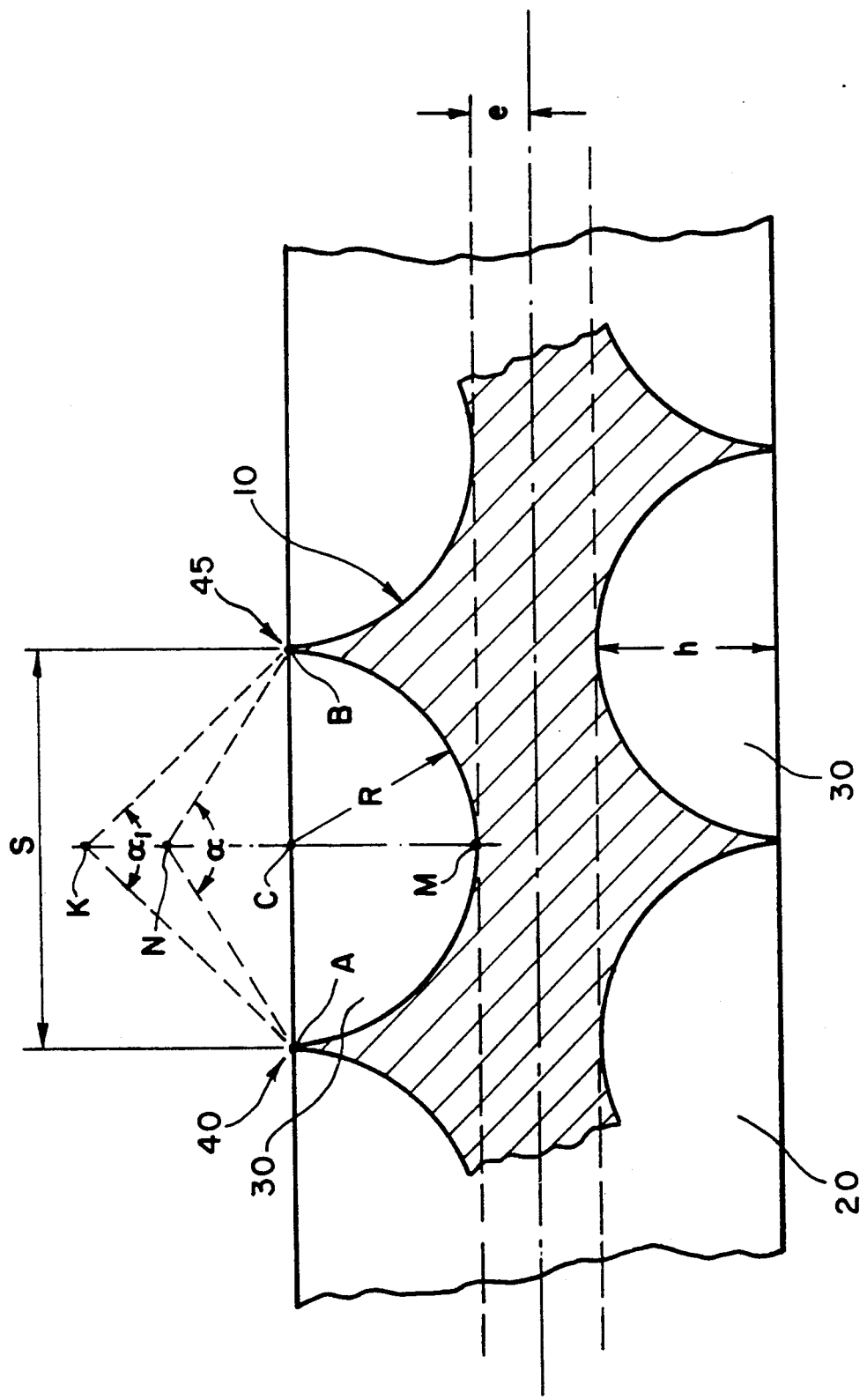
FIG. 3 is a horizontal cross-sectional view taken along line B—B of FIG. 2.

To determine the dimensions of the optimum screw shape, it is necessary to solve the equation for a line y=f(x) of the length e=S+2h which, when going through points 40 and 45 of FIG. 3, defines the maximum conveying cavity area $F_{max}$.

The volume Q of disperse medium forced out per revolution of the screw will be the maximum when, $$Q = F_{max} \cdot L \tag{4}$$

where L is the developed length of the helical line at one revolution of the screw calculated according to the following equation:

$$L = \sqrt{S^2 + (\pi D)^2} \tag{5}$$

The area limited by the curve $y=f(x)$ is calculated as the functional:

$$F = \int_{x_1}^{x_2} y \, dx \tag{6}$$

The conditions of constancy of the curve length $l = S + 2h$ is calculated as the functional:

$$l = \int_{x_1}^{x_2} \sqrt{1 + x\left(\frac{dy}{dx}\right)^2} \, dx \tag{7}$$

Solving the functionals 6 and 7 of the family of curves $y=f(x)$ going through points 40 and 45, the extremum (at fixed pitch S and depth h) results from the single curve which is essentially the equation of the circle:

$$\left(X - \frac{S}{2}\right)^2 + \left(Y - \sqrt{\lambda^2 - \frac{S^2}{4}}\right)^2 = \lambda^2 \tag{8}$$

where $\lambda$ is the circle radius. The coordinates of the circle center are solved by the equations:

$$X_y = \frac{S}{2}; \quad Y_y = \sqrt{\lambda^2 - \frac{S^2}{Y}} \tag{9}$$

As is obvious from FIG. 3, the circle coordinate C lies on the vertical line between point 40 and point 45.

The shape of the cavity 30 formed is a semicircle, resulting in the maximum cavity area.

Referring to FIG. 3, maximum cavity area $F_{max}$ is solved as follows:

$$F_{max} = F_{sec} - 2F_{tr} \tag{10}$$

where $F_{sec}$ is the area of sector ANBM, and $2F_{tr}$ is double the area of triangle AON;

$$F_{sec} = \frac{\pi \lambda^2 \alpha}{360°} \tag{11}$$

where $\alpha$ is central angle ANB; and $$2F_{tr} = \frac{S}{2} \cdot Y_{cen} \tag{12}$$

Thus, the actual output volume of the screw pump for one revolution will be equal to:

$$Q = \sqrt{S^2 + (\pi D)^2} \left(\frac{\pi \lambda^2 \alpha}{360°} - \frac{S}{2} Y_y\right) n \tag{13}$$

Analysis of equation 13 shows that the size of conveying cavity is maximized when $y_{cen}$ is tending to zero, i.e., when circle center (point C) lies at the center of the line tangent to points 40 and 45 of the screw-rotor.

The optimum disposition of the zero radius center describing the screw cavity profile is in the middle of the line tangent to the screw external surface. If the curvature center is higher than point C in the vertical line, then the screw profile depth will be decreased and, consequently, the capacity will be decreased.

If the center of curvature is lying in the vertical line below point C, then when the screw and stator are coupled, a void area is formed and the material being pumped will be rotated without being displaced along the longitudinal axis. In addition, the displacement of center C downwards will bring about a decrease of the screw cross-section, i.e., a reduction of its strength.

Taking into account that the screw channel depth (h) is equal to double the eccentricity (e), to obtain the optimum construction of the screw the pitch S should be equal to:

$$S = 4e, \tag{14}$$

and the curvature radius is equal to the double eccentricity.

The optimum outer diameter D of the screw should be equal to:

$$D = d + 2e, \tag{15}$$

where d is the screw cross-section diameter.

Testing has been performed comparing a standard screw pump with one constructed according to the present invention. As the test results show (See Table 1 below), the capacity of the screw constructed according to the present invention is 1.7 times greater than the prior art screw tested.

TABLE 1

| Screw pumps parameters | Prior Art | Present Invention |
| --- | --- | --- |
| Step, mm | 48 | 48 |
| External diameter, mm | 60 | 60 |
| Center curvature coordinate, mm | 30 | 0 |
| Screw rotational frequency, rpm | 175 | 175 |
| Amplitude, mm | 5 | 12 |
| Screw section diameter, mm | 50 | 30 |
| Screw capacity, m$^3$/min | $8.1 \times 10^{-3}$ | $14.2 \times 10^{-3}$ |

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A helical screw, having spiral convolutions and a conveying cavity, and having a cross section with the following geometric parameters:

an outer diameter D defined as the diameter of a first circle described by the cross section of a cylinder into which said helical screw snugly fits, said cross section of said cylinder being taken perpendicular to the longitudinal axis of said cylinder;

a cross-sectional diameter d defined as the diameter of a second circle described by the cross section of said helical screw through the outermost point of one of said spiral convolutions, said cross section of said helical screw being taken perpendicular to the longitudinal axis of said screw;

wherein the following equations are satisfied:

$$h = D - d,$$

where h is the channel depth of said helical screw;

$$S = 2h,$$

where S is the pitch of said helical screw; and $$e = \tfrac{1}{2}D - \tfrac{1}{2}d,$$

where e is the eccentricity of the helical screw, defined as the distance between the centers of said first and said second circles.